(12) United States Patent
Erez

(10) Patent No.: US 8,762,494 B2
(45) Date of Patent: Jun. 24, 2014

(54) PROCESS AND SYSTEM FOR LOADING FIRMWARE

(75) Inventor: Eran Erez, Ein HaShofet (IL)

(73) Assignee: Eltam Ein Hashofet, Kibbutz Ein HaShofet (IL)

( * ) Notice: Subject to any disclaimer, the term of this patent is extended or adjusted under 35 U.S.C. 154(b) by 433 days.

(21) Appl. No.: 13/205,140

(22) Filed: Aug. 8, 2011

(65) Prior Publication Data

US 2012/0036506 A1 Feb. 9, 2012

(51) Int. Cl.
 *G06F 15/16* (2006.01)

(52) U.S. Cl.
 USPC ............ 709/218; 709/200; 709/202; 709/217

(58) Field of Classification Search
 USPC ................ 709/200, 202, 217, 218, 224, 246; 713/167, 189, 193, 200; 726/23, 24
 See application file for complete search history.

(56) References Cited

U.S. PATENT DOCUMENTS

| 7,424,611 | B2* | 9/2008 | Hino et al. | 713/167 |
| 2002/0166059 | A1* | 11/2002 | Rickey et al. | 713/200 |
| 2003/0221114 | A1* | 11/2003 | Hino et al. | 713/189 |
| 2010/0306555 | A1* | 12/2010 | Sasahara et al. | 713/193 |
| 2011/0047618 | A1* | 2/2011 | Evans et al. | 726/23 |
| 2011/0107423 | A1* | 5/2011 | Kolar Sunder et al. | 726/24 |

* cited by examiner

*Primary Examiner* — Quang N Nguyen
(74) *Attorney, Agent, or Firm* — Stetina Brunda Garred & Brucker

(57) ABSTRACT

In a process for loading firmware via a hub into a group of interconnected control devices, a set of communication frames is transmitted by the hub and addressed to at least one of the control devices in the group for reaching all of the interconnected control devices therein. First and second inquiries regarding validity and invalidity respectively of the set of frames are sent collectively to the group, and based on replies from any of the control devices that have received at least one of the inquiries, the set of frames is re-transmitted or a successive set of frames is transmitted or loading of the firmware is aborted, the process being repeating all portions of the firmware are loaded.

7 Claims, 6 Drawing Sheets

PROCESS AND SYSTEM FOR LOADING FIRMWARE

FIELD OF THE INVENTION

The present invention relates to loading a plurality of electronic ballasts with firmware.

BACKGROUND OF THE INVENTION

In lighting systems comprising a plurality of electronic ballasts there is a need, from time to time, to modify the program governing the operation of the ballasts, while the communication quality with some or all of the ballasts may be poor.

SUMMARY OF THE INVENTION

The present invention offers a process for loading firmware into a group of interconnected control devices.

In accordance with a first embodiment, the process comprises:
 (a) transmitting a set of communication frames that include at least a portion of the firmware, said set of communication frames being addressed to at least one of the control devices in the group for reaching all of the interconnected control devices in said group;
 (b) sending collectively to said group a first inquiry regarding validity of said set of frames and a second inquiry regarding invalidity of said set of frames;
 (c) upon receiving one or more replies that are not indicative of a fatal error from any of said control devices that have received at least one of said inquiries, either re-transmitting said set of frames or transmitting a successive set of frames with a successive portion of the firmware in accordance with said replies;
 (d) repeating the process from (a) to (c) until all frames are transmitted and all portions of the firmware are loaded; and
 (e) aborting the process if any of said replies is indicative of a fatal error.

In accordance with a second embodiment, there is provided a process for loading a plurality of interconnected control devices with software, the process comprising loading at least one of said devices with data that include a virus code, said virus code being programmed to infect and load other devices with said data.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
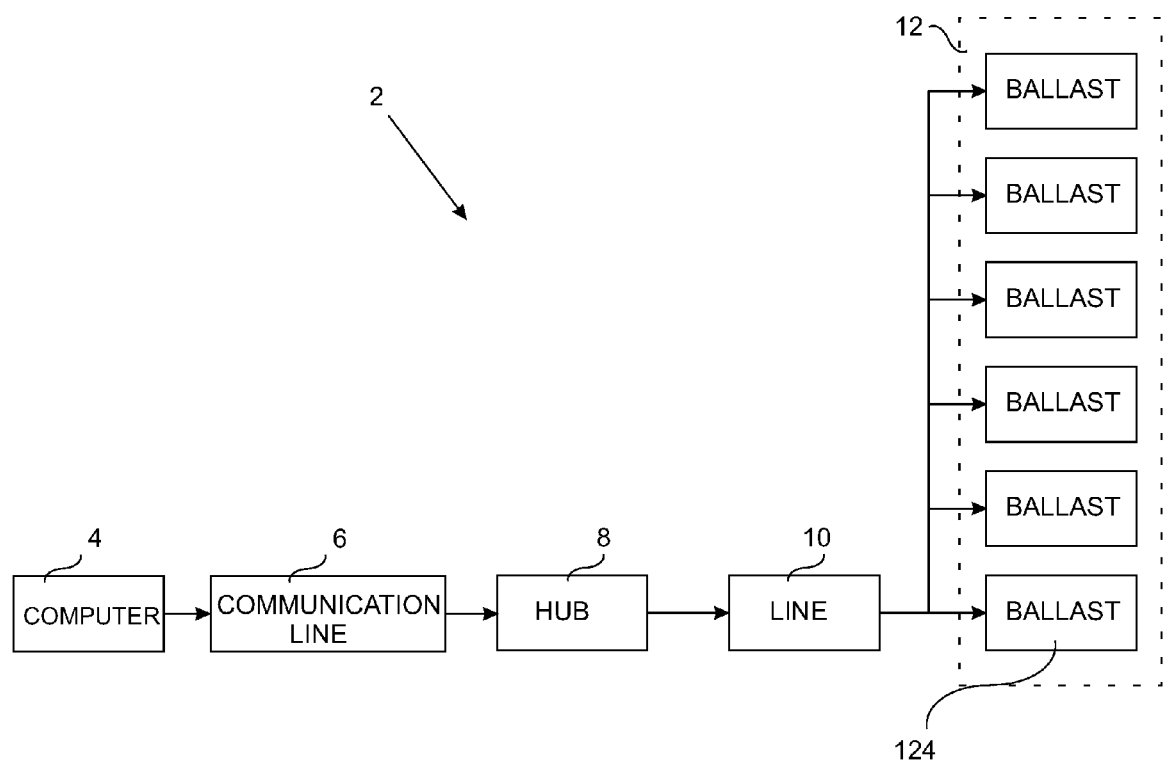
FIG. 1 is a block diagram of a circuit implementing the process according to the present invention.
Figure 2:
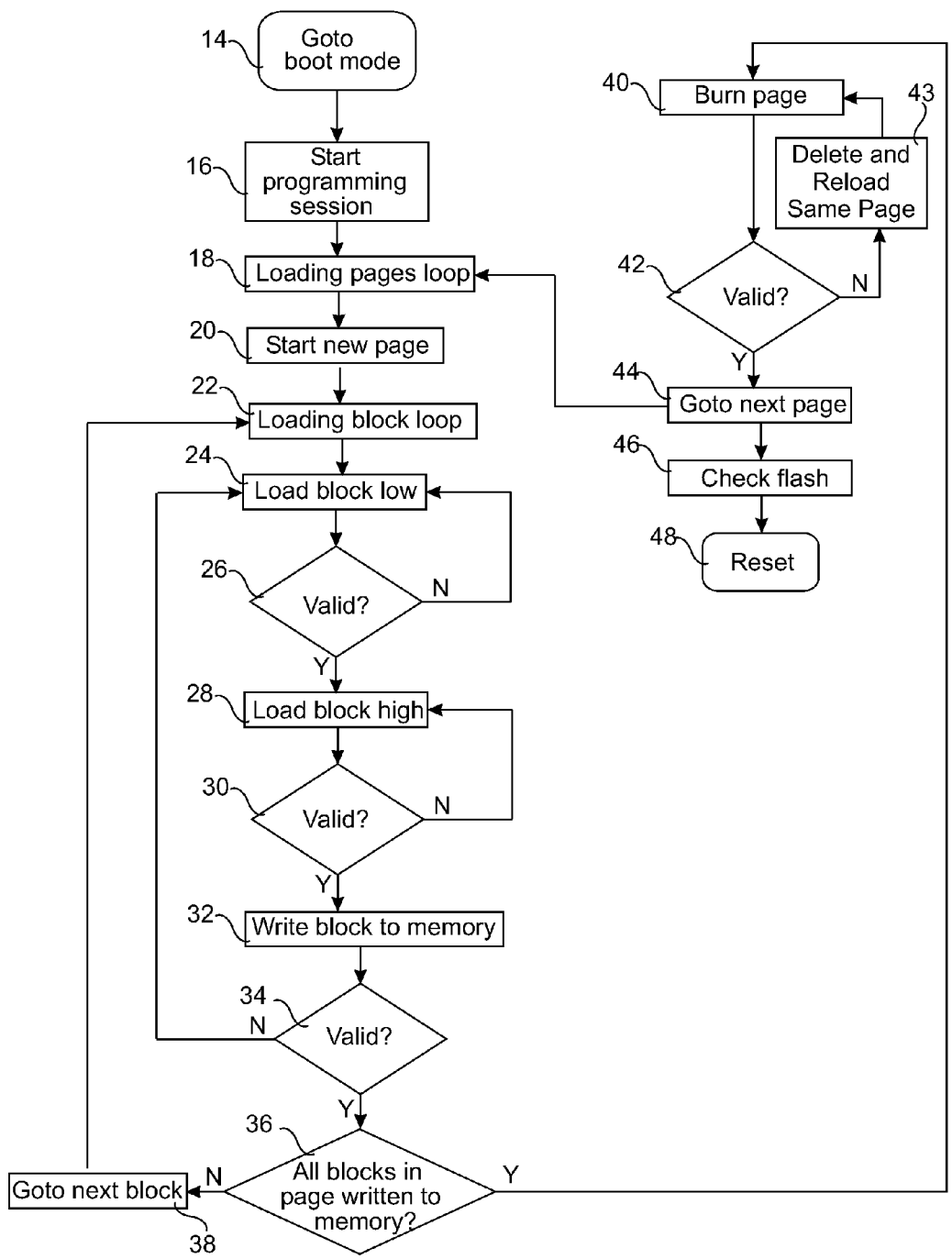
FIG. 2 is a flow diagram of a preferred embodiment of the present invention.

FIG. 1 represents a block diagram of a system 2 that is capable of implementing an embodiment of the present invention. The system 2 includes a computer 4 that transfers data, inquiries and instructions through a communication line 6, which may be wire or wireless, to and from a hub 8. The hub 8 communicates, e.g. by means of a modem, through a line 10, which may be, e.g. a power line, DALI line or wireless, with a group of ballasts 12. Each of the ballasts includes a controller which receives data, inquiries and instructions. The controllers follow the instructions and reply to the inquiries. Under favorable conditions, it may be possible in principle to communicate and exchange data with each ballast separately, but otherwise the process described in FIG. 2 is to be preferred. The entire group of ballasts 12 is instructed to change mode to boot 14 and start programming session 16. Now loading pages loop 18 begins with a new page 20. This loop begins with a sub-loop 22 of block loading, which in turn is subdivided into low and high parts. Block low loading 24 is followed by a validity test 26, which if positive is followed by block high loading 28 and if negative returns to 24. Block high loading 28 is followed by a validity test 30, which if positive is followed by writing the entire block to memory 32. The validity of the writing process 32 is tested 34 and a positive result is followed by an inquiry 36 asking whether all the blocks in the present page have been written to the memory of the ballast controller. A negative reply returns the process to loading next block 38 through loading block loop 20. A positive reply to inquiry 36 is followed by burning page 40, which is followed by a validity test 42. A negative result indicating that the burning process failed is followed by the page being deleted and the same page being reloaded 43. A positive result turns the process to next page 44 and if all the pages have been burnt, to flash checking 46. A positive result instructs the ballasts' controllers to reset 48 and conclude the process. For better understanding of the process, the following figures further specify several steps of the flow diagram of FIG. 2.

Figure 3A:
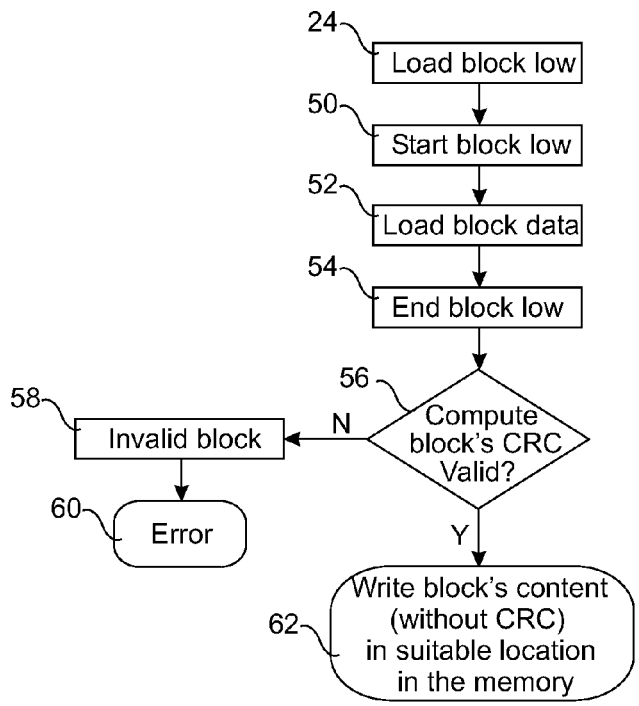
FIG. 3 is a flow diagram specifying step "data block loading" of FIG. 2.
Figure 3B:
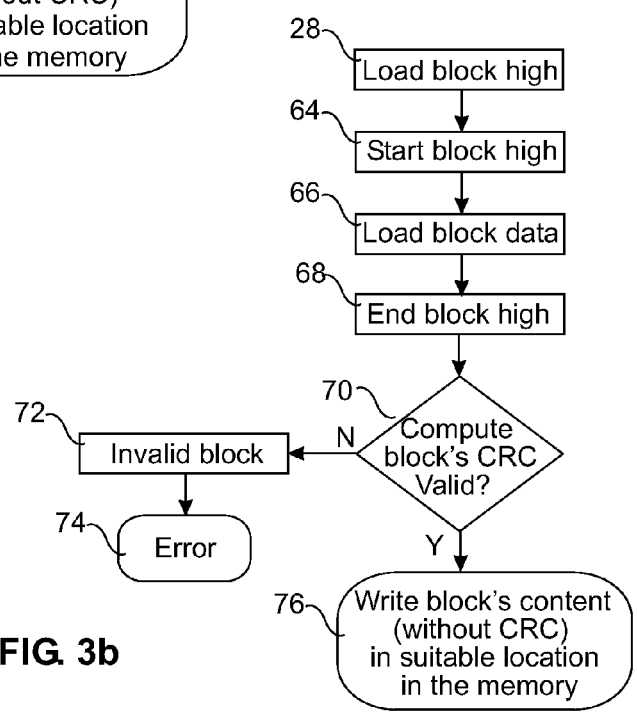

FIG. 3 further specifies steps 24 and 28 of FIG. 2. Step 24 comprises:
 Starting block low 50, loading block data 52, ending block low procedure and computing block's cyclic redundancy check (CRC);
 CRC positive result leads to writing block's content (without CRC) in suitable location in memory 62 of ballast's controller whereas negative result issues error signal 60. In the case of an error, the loading process is aborted. Step 28 follows the same procedure as step 24.

Figure 4:
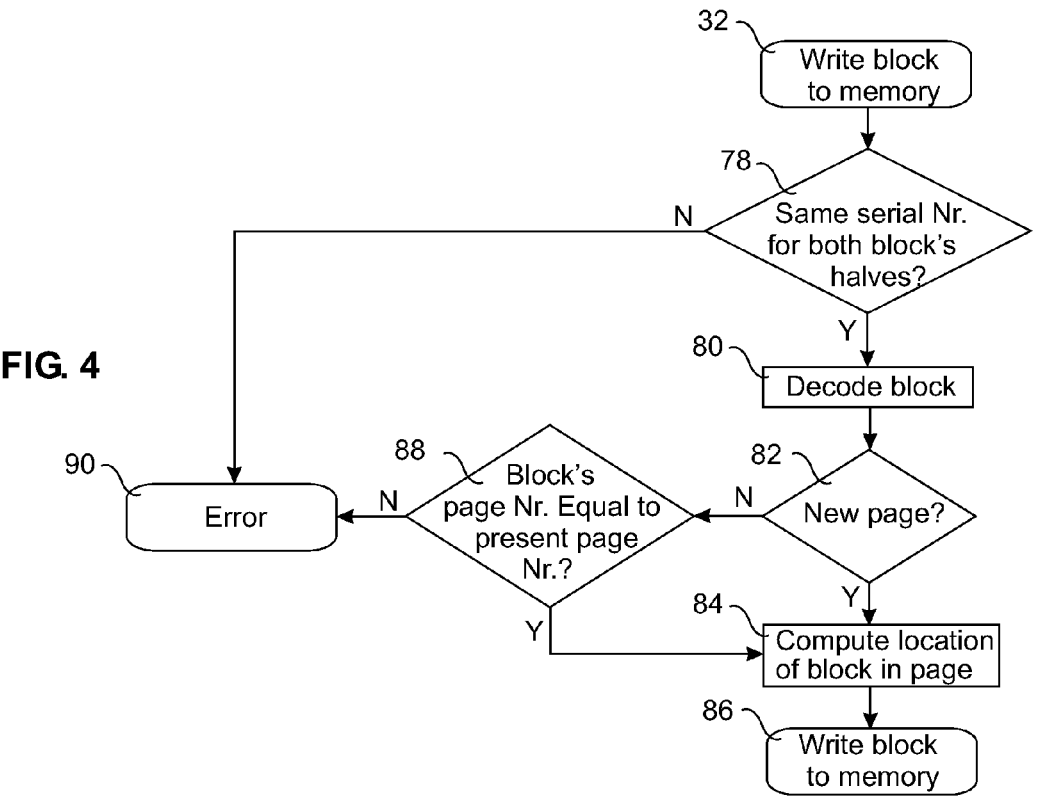
FIG. 4 is a flow diagram specifying step "write block to memory" of FIG. 2.

FIG. 4 further specifies step 32 of FIG. 2. Step 32 comprises:
 inquiry regarding serial numbers of block's halves 78;
 equality of serial numbers leads to decoding block 80 whereas inequality issues error signal 90;
 decoding block 80 is followed by inquiry regarding the page 82;
 positive reply leads to computing location of block in page 84 followed by writing the block in memory 86 whereas negative reply leads to further inquiry regarding equality of block and present page numbers;
 positive reply leads to computing location of block in page 84 followed by writing the block to memory 86 whereas inequality issues error signal 90 whereupon the loading process is aborted.

Figure 5:
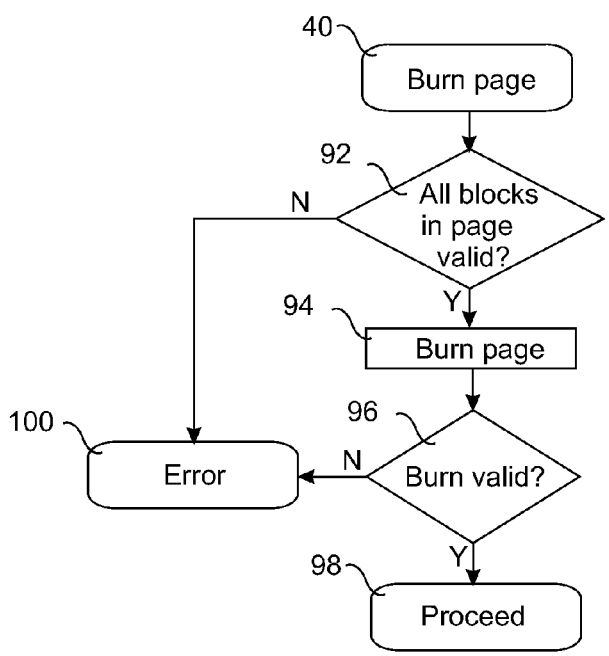
FIG. 5 is a flow diagram specifying step "burn page" of FIG. 2.

FIG. 5 further specifies step 40 of FIG. 2. Step 40 comprises:
 inquiry regarding validity of all blocks in the present page 92 with positive reply leading to burning the page 94 followed by further inquiry regarding validity of the burn 96 with positive reply leading to conclusion of the burning procedure 98;
 negative replies to inquiries 92 and 96 issue error signal 100.

Figure 6:
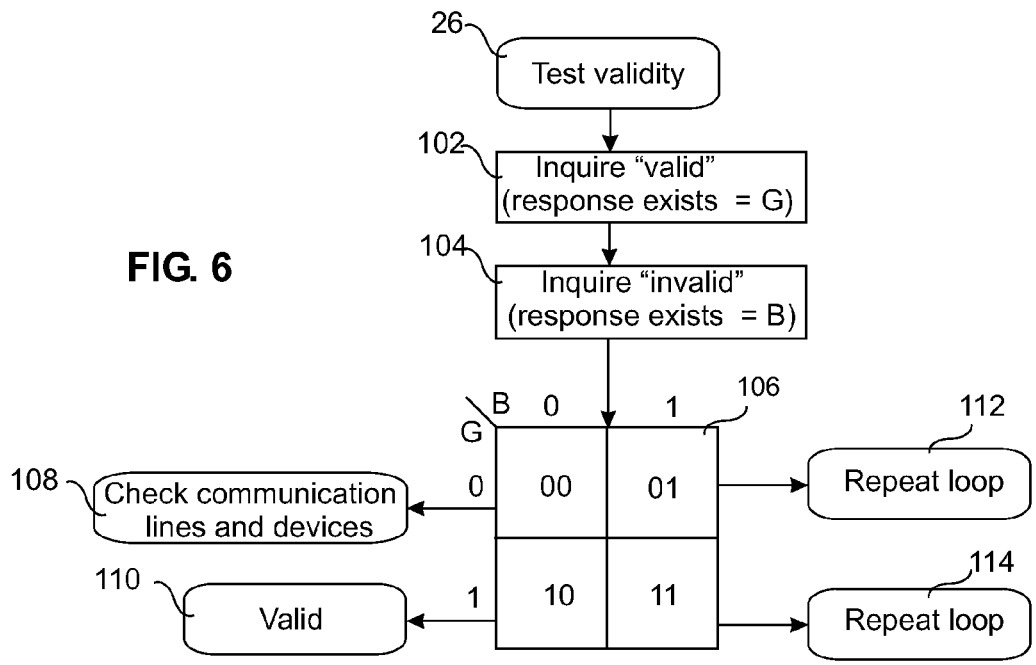
FIG. 6 is a flow diagram specifying step "test validity" of FIG. 2.

FIG. 6 further specifies the validity tests of FIG. 2, e.g. step 26, comprising:
 interrogating collectively the group of ballasts regarding validity 102 of the set of information transmitted to them;
 interrogating collectively the group of ballasts regarding invalidity 104 of the frames transmitted to them;
 receiving replies according to truth table 106 from some of said ballasts that have received at least one inquiry;
 squares 01 and 11 mean negative test results and lead to steps 112, 114 respectively, i.e. to repeating the relevant information transmission loop;
 square 00 means communication failure and hence premature termination of the data transfer process. Communication lines and devices must be checked 108;
 square 10 means positive test result and leads to advancement of the process.

It will be appreciated that FIG. 6 is exemplary and if desired the order of interrogating the ballasts regarding validity of the frames and interrogating the ballasts regarding invalidity of the frames transmitted to them may be reversed.

Figure 7:
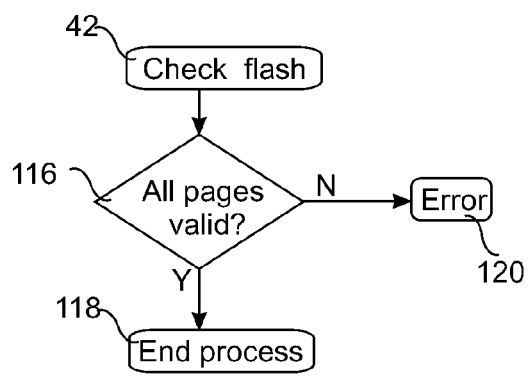
FIG. 7 is a flow diagram specifying step "check flash" of FIG. 2.

FIG. 7 further specifies step 42 of FIG. 2. Step 42 comprises:
 interrogating the group of ballasts regarding validity of all pages 116;
 positive reply leading to termination of the information transmission process 118;
 negative reply issues error signal 120.

In the above embodiment, the communication protocol between the hub 8 and the ballasts requires multiple transmissions between the hub 8 and the ballasts. Since, in response to an incoming inquiry, the ballast sends one of two different signals back to the hub depending on whether the reply is positive or negative, additional processing and transmitting time is required by the ballast since it must determine which of two signals to transmit and it is constrained to respond in both cases. Likewise, additional processing time is required by the hub, since it has to parse the reply received from the ballast in order to establish whether the reply were positive or negative. In accordance with an alternative protocol, this overhead can be reduced by the ballast sending to the hub a short pulse, which can be an empty carrier wave and which is interpreted by the hub as a positive reply to its inquiry. Absence of a response within a given very short time frame is interpreted by the hub as a negative reply to its inquiry. According to such a protocol processing and transmission times are reduced resulting in faster communication.

Figure 8:
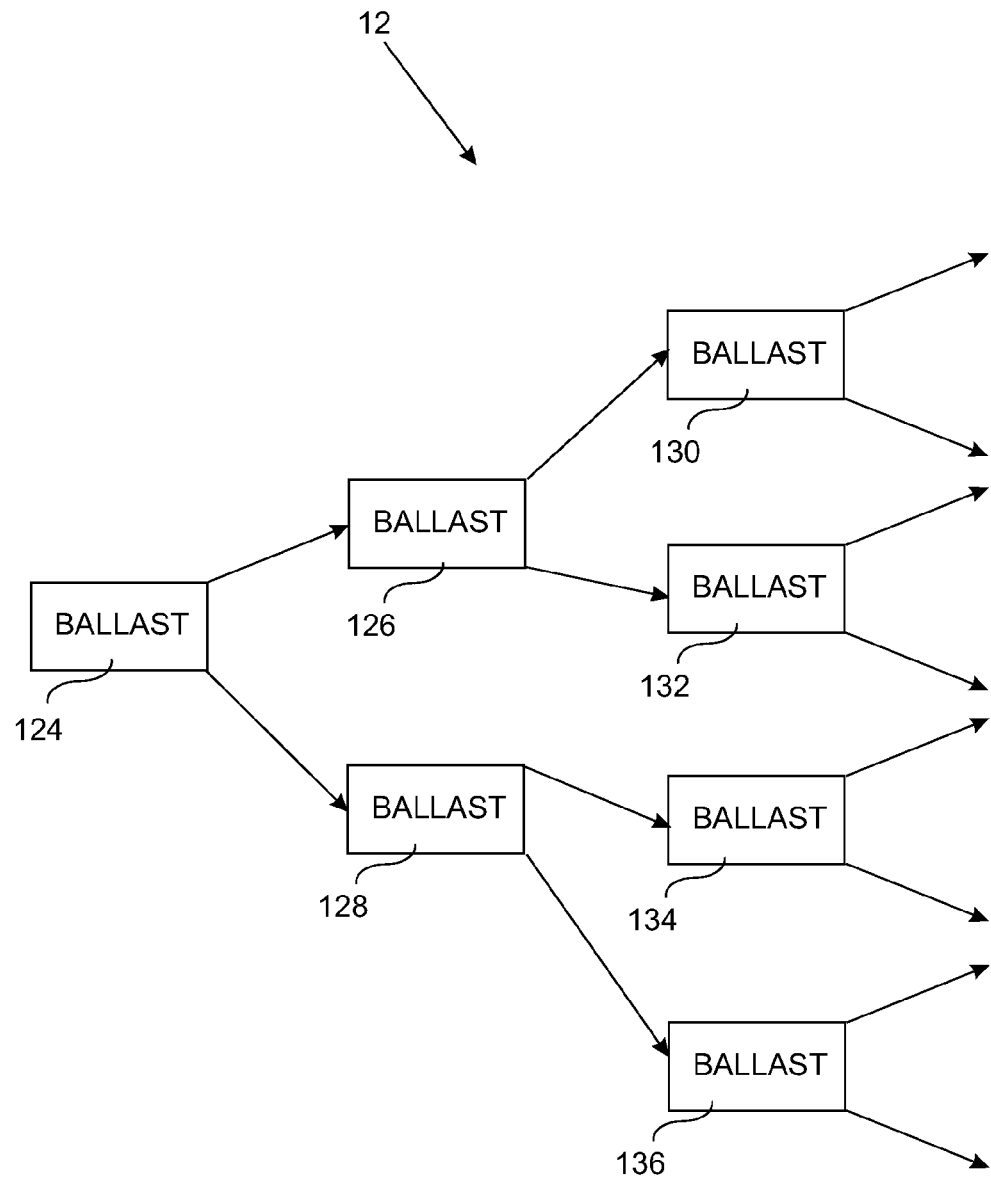
FIG. 8 is a diagram of the data flow according to the present invention.

The invention as so far described and as shown in FIG. 1 relates to the problem where direct communication between the hub 8 and some of the ballasts is poor or nonexistent. In accordance with another embodiment this difficulty may be overcome by transmitting data to the ballasts that contains a virus code. In FIG. 1 the ballasts are shown functionally as a network containing a number of parallel ballasts, one of which is identified as 124. FIG. 8 is a block diagram showing the ballast network of FIG. 1 in expanded detail according to an embodiment of the invention. The ballast 124 constitutes a first ballast that is coupled to second and third ballasts 126 and 128. The second ballast is similarly coupled to fourth and fifth ballasts 130 and 132, while the third ballast is similarly coupled to sixth and seventh ballasts 134 and 136. It will be understood that the network 12 is representative and in practice, each of the ballasts may be coupled to any number of ballasts. Thus, referring again to FIG. 1, should the communication between the hub 8 and, e.g. ballast 124 be good and ballast 124 receives the full data whereas other ballasts in the network 12 fail to do so, the virus code included in the data received by ballast 124 is activated and infects some other ballasts with itself as well as with the entire relevant data. The ballasts thus infected continue to infect others, thereby spreading the new data among other ballasts in the network.

With further reference to FIG. 2, assume that ballasts in the network 12 were initially addressed by the hub 8 according to FIG. 1 and that the ballast 124 has been correctly loaded with the data transmitted by hub 8, whereas ballasts 126-136 were unreachable directly due to poor communication. The virus included in the new data in the ballast 124 turns active and initiates a data loading process that reaches ballasts 126 and 128 since they have better communication with the ballast 124 than with the hub 8. The virus can be activated automatically after a predetermined time frame set by the ballasts, such that after the expiry of the time frame set for each ballast following arrival of the virus code, the virus is activated. In this case, different time frames can be defined for each of the ballasts. Alternatively, the virus can be activated globally by transmitting an activation signal through the network, which will reach only those ballasts that are reached by the activation signal. Ballasts 126 and 128 are now similarly activated by the virus with regard to ballasts 130-132 and 134-136 respectively and so on. Thus the virus spreads from one ballast to another and data is distributed by way of a Daisy Chain (or Chain Reaction).

It will be understood that the while some embodiments of the invention have been described with particular regard to loading firmware in electronic ballasts, the invention is generally applicable to loading a plurality of interconnected control devices with software.

In the method claims that follow, alphabetic characters used to designate claim operations are provided for convenience only and do not imply any particular order of performing the operations. Likewise, the order of operations recited in the claims is not intended to be limiting, it being well understood by those skilled in the art that not all operations recited in the claims need necessarily be carried out in the order they appear in the claims.

The invention claimed is:

1. A process for loading firmware into a group of interconnected control devices, said process comprising:
 (a) transmitting a set of communication frames that include at least a portion of the firmware, said set of communication frames being addressed to at least one of the control devices in the group for reaching all of the interconnected control devices in said group;
(b) sending collectively to said group a first inquiry regarding validity of said set of communication frames and a second inquiry regarding invalidity of said set of communication frames;
(c) upon receiving one or more replies that are not indicative of a fatal error from any of said control devices that have received at least one of said inquiries, either re-transmitting said set of communication frames or transmitting a successive set of communication frames with a successive portion of the firmware in accordance with said replies;
(d) repeating the process from (a) to (c) until all frames are transmitted and all portions of the firmware are loaded; and
(e) aborting the process if any of said replies is indicative of a fatal error;
wherein said set of communication frames includes a virus code that is transmitted to at least one of the control devices, said virus code being programmed to infect and load other ones of said control devices with said firmware and wherein said virus code is activated automatically after a predetermined time frame set by the control devices following arrival of said virus code.

2. The process of claim 1, wherein any reply following an inquiry means positive reply to said inquiry.

3. The process of claim 2, wherein the first set of frames is transmitted again if no reply is received to the first inquiry and a reply is received to the second inquiry, or if replies are received to both inquiries.

4. The process of claim 2, wherein said loading is interrupted if no replies are received to both of said inquiries.

5. The process according to claim 1, wherein the virus is activated globally by transmitting an activation signal through a network.

6. The process according to claim 1, wherein the interconnected control devices are electronic ballasts.

7. A system for loading firmware into a group of interconnected control devices, said system comprising a computer configured to transfer data, inquiries and instructions through a communication line to a group of control devices and to receive replies from the control devices, said computer being adapted to:
(a) transmit a set of communication frames that include at least a portion of the firmware, said set of communication frames being addressed to at least one of the control devices in the group for reaching all of the interconnected control devices in said group;
(b) send collectively to said group a first inquiry regarding validity of said set of communication frames and a second inquiry regarding invalidity of said set of communication frames;
(c) upon receiving one or more replies that are not indicative of a fatal error from any of said control devices that have received at least one of said inquiries, either re-transmit said set of communication frames or transmit a successive set of communication frames with a successive portion of the firmware in accordance with said replies;
(d) repeat operations (a) to (c) until all frames are transmitted and all portions of the firmware are loaded; and
(e) abort the process if any of said replies is indicative of a fatal error;
wherein said set of communication frames includes a virus code that is transmitted to at least one of the control devices, said virus code being programmed to infect and load other ones of said control devices with said firmware and wherein said virus code is activated automatically after a predetermined time frame set by the control devices following arrival of said virus code.

* * * * *